(12) United States Patent
Kamiya

(10) Patent No.: US 11,628,604 B2
(45) Date of Patent: Apr. 18, 2023

(54) BOARD AND METHOD OF PRODUCING THE SAME

(71) Applicant: TOYOTA BOSHOKU KABUSHIKI KAISHA, Aichi-ken (JP)

(72) Inventor: Hideo Kamiya, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 88 days.

(21) Appl. No.: 17/379,384

(22) Filed: Jul. 19, 2021

(65) Prior Publication Data
US 2022/0024088 A1 Jan. 27, 2022

(30) Foreign Application Priority Data
Jul. 22, 2020 (JP) .............................. JP2020-125233

(51) Int. Cl.
| | | |
|---|---|---|
| B60R 13/00 | (2006.01) | |
| B29C 45/14 | (2006.01) | |
| B60R 13/02 | (2006.01) | |
| B29L 31/30 | (2006.01) | |
| B29K 23/00 | (2006.01) | |

(52) U.S. Cl.
CPC .... *B29C 45/1418* (2013.01); *B29C 45/14311* (2013.01); *B60R 13/0243* (2013.01); *B29C 2045/14327* (2013.01); *B29C 2793/0045* (2013.01); *B29K 2023/12* (2013.01); *B29L 2031/3014* (2013.01)

(58) Field of Classification Search
None
See application file for complete search history.

(56) References Cited

FOREIGN PATENT DOCUMENTS

JP  2001-179716 A  7/2001

*Primary Examiner* — Alexander S Thomas
(74) *Attorney, Agent, or Firm* — Greenblum & Bernstein, P.L.C.

(57) ABSTRACT

A board includes fibers and thermoplastic resin and has a first surface and a second surface that is opposite from the first surface. The board includes a flat body member having edges, a bent portion, a hole, and a filling portion that is made of thermoplastic resin and in the hole. The bent portion extends from one of the edges of the flat body member and includes an edge of the board. The bent portion includes an angled portion that extends along the one of the edges of the flat body member and the bent portion extends from the angled portion at an inclination angle with respect to the flat body member such that the first surface of the angled portion is stretched. The hole is in the first surface of the angled portion.

9 Claims, 11 Drawing Sheets

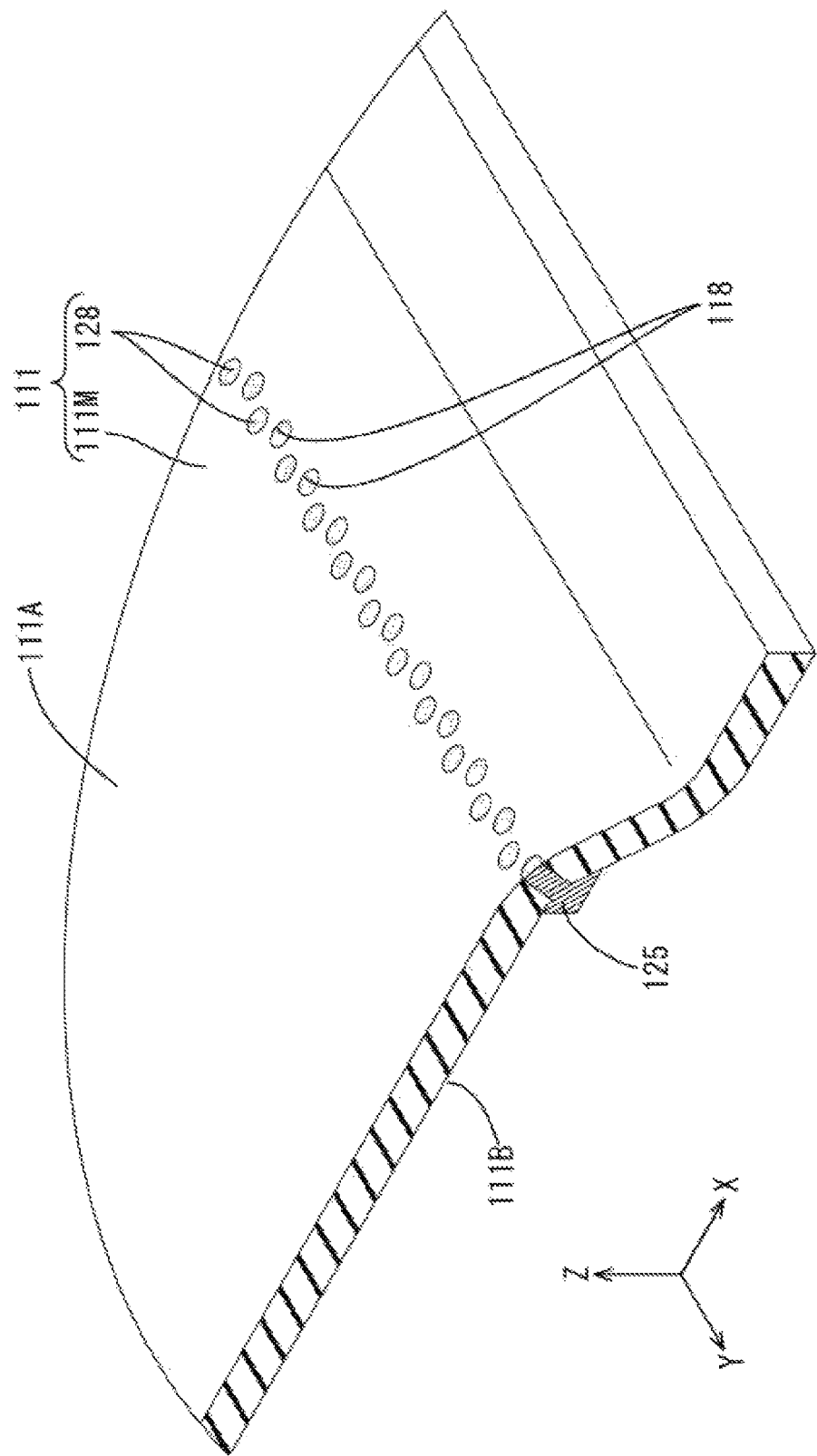

BOARD AND METHOD OF PRODUCING THE SAME

CROSS REFERENCE TO RELATED APPLICATION

This application claims priority from Japanese Patent Application No. 2020-125233 filed on Jul. 22, 2020. The entire contents of the priority application are incorporated herein by reference.

TECHNICAL FIELD

The present disclosure described herein relates to a board and a method of producing a board.

BACKGROUND

A known method of producing a board includes forming a fiber mat plate for heat molding that is made of resin fibers and plant fibers and heating and cooling the fiber mat plate to obtain a preboard, and heating the preboard again to a temperature that allows the resin included in the preboard to be melted and pressing the preboard with upper and lower dies for cold pressing molding.

SUMMARY

In the above method, the heating process is performed in a process of forming the preboard and in a process of molding the board. Namely, the heating process is performed twice. This increases a processing cost and a cycle time and eventually increases a producing cost. Furthermore, in the heating process, peculiar bad smell comes off from the preboard and volatile organic compounds are generated from the preboard and this adversely affects environment.

The number of performing time of the heating process may be reduced to solve such a problem. However, if the process of reheating the preboard is not performed in molding the board, the preboard (the board) that is hard is less likely to be stretched. This may cause breaking in an outer surface of a bent portion and cause a defect in the board or the shape of the board may not be maintained after the bending.

An object of the present technology described herein is to provide a board obtained with a small number of performing time of a heating process and a method of producing a board with reduced number of performing time of the heating process.

According to one aspect of the technology described herein, a board including fibers and thermoplastic resin and having a first surface and a second surface that is opposite from the first surface includes a flat body member having edges, a bent portion, a hole, and a filling portion that is made of thermoplastic resin and in the hole. The bent portion extends from one of the edges of the flat body member and includes an edge of the board. The bent portion includes an angled portion that extends along the one of the edges of the flat body member. The bent portion extends from the angled portion at an inclination angle with respect to the flat body member such that the first surface of the angled portion is stretched. The hole is in the first surface of the angled portion.

According to another aspect of the technology described herein, a method of producing a board includes steps of forming a preboard by heating and pressing a mat with a pressing die, the mat including fibers and thermoplastic resin, cutting the preboard to form a hole on a first surface of the preboard such that an opening of the hole is on the first surface, pressing the preboard having the hole at a temperature at which the thermoplastic resin is not molten to bend the preboard along the hole such that the first surface is stretched to enlarge the opening of the hole, and obtaining a board base member, and supplying the thermoplastic resin into the hole having an enlarged opening.

BRIEF DESCRIPTION OF THE DRAWINGS

FIG. 11 is an enlarged perspective view illustrating a portion of FIG. 10.

DETAILED DESCRIPTION

First Embodiment

A first embodiment will be described with reference to FIGS. 1 to 9. In this embodiment, a trim board 11, which is a vehicular interior component, included in a vehicular door trim and a method of producing the trim board 11 will be described as one example of a board and a method of producing the same. In some of the drawings, an X-axis, a Y-axis, and a Z-axis are indicated and each of the axial directions corresponds to a direction indicated in each drawing. The vertical direction is defined with reference to FIG. 1 and an upper side and a lower side in FIG. 1 correspond to a front side and a back side, respectively. One of the same components is indicated by a symbol and other ones may not be indicated by the symbols.

Figure 1:
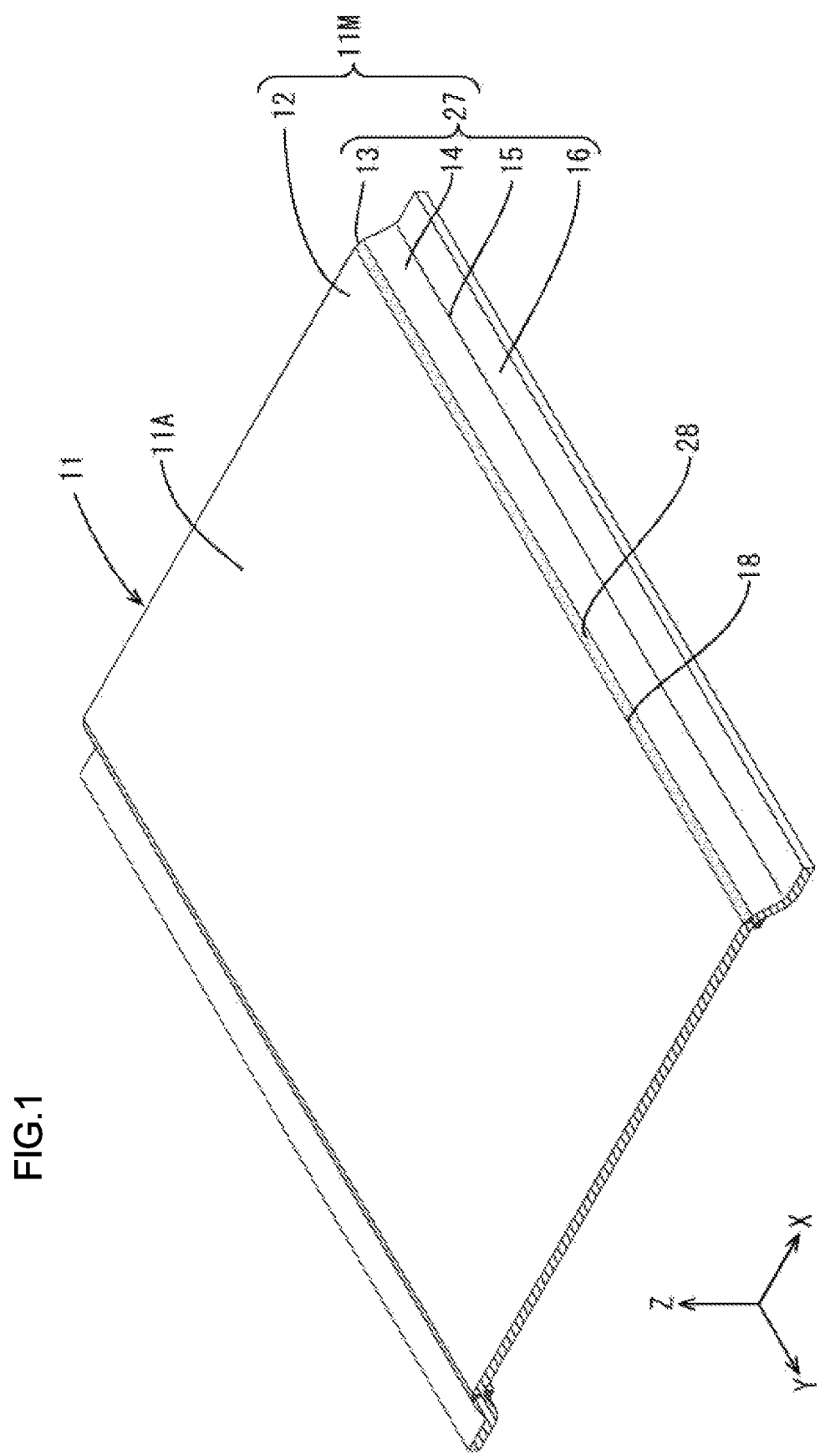
FIG. 1 is a perspective view illustrating a portion of a door trim of a first embodiment seen from a front side.
Figure 2:
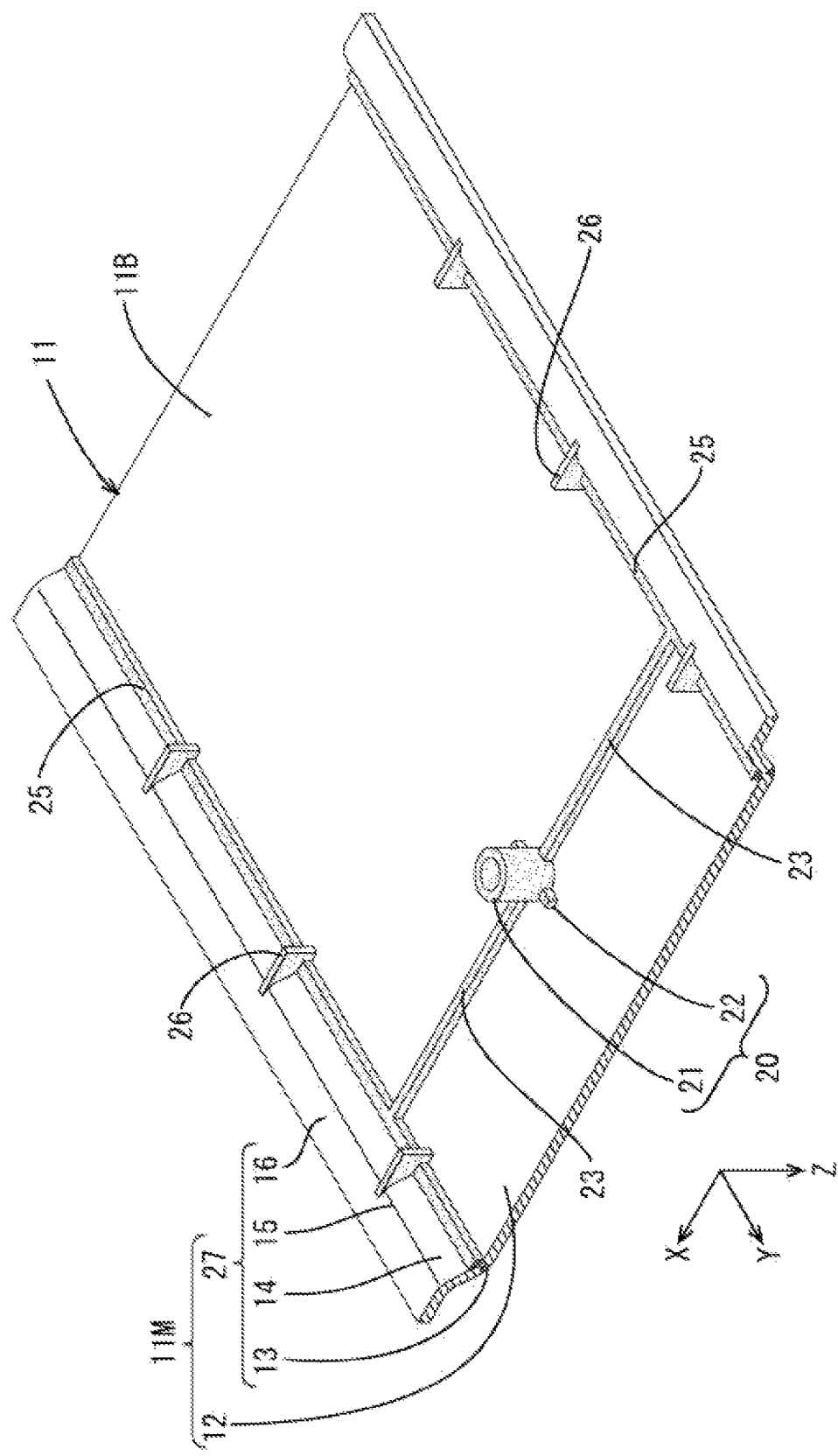
FIG. 2 is a perspective view illustrating the portion of the door trim seen from a back side.

The door trim will be described first. The door trim is included in a vehicular door of an automobile, for example. As illustrated in FIG. 2, the door trim includes the trim board 11 (one example of a board) that is a flat plate as a whole. As illustrated in FIG. 1, the trim board 11 has a front surface 11A (a vehicular interior side surface, one example of a first surface) and a back surface 11B (a vehicular exterior surface, one example of a second surface) that is an opposite surface of the front surface 11A. The trim board 11 includes a mounting boss 20 (one example of a molded component) and support ribs 26 (one example of a support member, one example of a molded component) on the back surface 11B. The mounting boss 20 and the support ribs 26 are integrally molded and included in the trim board 11 with injection molding.

The trim board 11 is made of fibers and thermoplastic resin. The fibers included in the trim board 11 may be kenaf fibers, for example, but may not be limited to kenaf fibers. The fibers included in the trim board 11 may be wood fibers, thermoplastic resin fibers, glass fibers, or carbon fibers. The fibers are bonded to each other with the thermoplastic resin, which is included as a binder, in the trim board 11. The thermoplastic resin that is included in the trim board 11 as the binder may be polyester resin such as polypropylene and polyethylene.

As illustrated in FIG. 1, the trim board 11 of this embodiment has a plan view quadrangular plate shape as a whole and includes bent portions 27 at two opposite edges extending in the Y-axis direction and the bent portions 27 are bent downward in FIG. 1 in a shape of a crank. Specifically, the trim board 11 includes a flat portion 12, which is a flat plate, in a middle section thereof with respect to the X-axis direction and the bent portions 27 on respective two edges of the flat portion 12 extending in the Y-axis direction. The bent portions 27 extend from the two edges of the flat portion 12 in the X-axis direction. Each of the bent portions 27 includes a first angled portion 13 (one example of an angled portion), a sloped portion 14, a second angled portion 15, and a flange portion 16.

The bent portion 27 is bent at the first angled portion 13 at a first angle with respect to the flat portion 12 and extends downward or toward the back surface 11B and is further bent at the second angled portion 15 at a second angle and extends laterally. The front surface 11A of the trim board 11 is stretched at the first angled portions 13. The back surface 11B is stretched at the second angled portions 15. The bent portions 27 are on the back surface 11B side with respect to the back surface 11B of the flat portion 12. The bent portion 27 includes the sloped portion 14 that extends from the first angled portion 13 at the first angle to the second angled portion 15 and the flange portion 16 that extends outward from the second angled portion 15 at the second angle with respect to the sloped portion 14. The flange portion 16 extends parallel to the flat portion 12.

As illustrated in FIG. 2, the mounting boss 20 is made of polypropylene, which is thermoplastic resin, and projects from the back surface 11B of the trim board 11. The mounting boss 20 includes a tubular portion 21 and support ribs 22 extending from the tubular portion 21 and also extending from the back surface 11B. The tubular portion 21 that has a tubular shape and is a mount portion with which components such as a door pocket, an ornament, and an armrest are fixed to the door trim. The support ribs 22 radially extend from a basal portion of the tubular portion 21. The basal portion of the tubular portion 21 is a joint section between the tubular portion 21 and the trim board 11. The support ribs 22 increase joint strength between the tubular portion 21 and the trim board 11.

The trim board 11 further includes two first ribs 23 that extend in opposite directions from the basal portion of the tubular portion 21. The first ribs 23 extend straight in the X-axis direction from the tubular portion 21 to the first angled portions 13, respectively. The first ribs 23 (a component molded in a first runner 63) are formed by cooling molten resin that is filled in the first runners 63. The molten resin flows in the first runners 63 to supply the molten resin for molding the mounting boss 20.

As illustrated in FIG. 2, the trim board 11 further includes second ribs 25 (one example of a rib, one example of the molded component) on the back surface 11B of the respective first angled portions 13. The second ribs 25 are inside corners of the angled portions 13 and extend along the entire length of the first angled portions 13, respectively, in the Y-axis direction. The second ribs 25 (a component molded in a second runner 64) are formed by cooling molten resin that is filled in the second runner 64. The molten resin flows in the second runners 64. The second ribs 25 are made of polypropylene that is one example of thermoplastic resin.

The trim board 11 includes the support ribs 26 (one example of the support member, one example of the molded component) on the back surface 11B of the bent portions 27. Each of the support ribs 26 is a X-Z plane plate member that extends in a direction crossing the extending direction of the first angled portion 13 (the Y-axis direction). Each of the support ribs 26 extends from the flat portion 12 to the flange portion 16 via the first angled portion 13 and the sloped portion 14. The support ribs 26 suppress the bent portion 27 of the trim board 11 from being deformed to be flat at the first angled portions 13. As illustrated in FIG. 2, each of the support ribs 26 extends from the flat portion 12 in the Z-axis direction farther than the back surface 11B of the flange portion 16. Namely, the support ribs 26 project from the back surface 11B of the flange portions 16. Each support rib 26 partly projects from the back surface 11B of the flange portion 16. Each of the second ribs 25 extends to connect the support ribs 26.

In this embodiment, as illustrated in FIG. 1, the trim board 11 includes grooves 18 (one example of a groove, a hole), each of which is a V-shaped recess, on the front surface 11A (on an outer surface of the angled corner) of the respective first angled portions 13. Each of the grooves 18 extends in the Y-axis direction over an entire length of the first angled portion 13. The trim board 11 includes filling portions 28 on the front surface 11A of the first angled portions 13. Specifically, the grooves 18 are filled with the filling portions 28, respectively, and the filling portions 28 are made of thermoplastic resin such as polypropylene. The filling portions 28 and the grooves 18 will be described more in detail later.

A device of producing the trim board 11 included in a door trim will be described next. The device of producing the trim board 11 includes pressing dies 30, 31 and a molding device 40. The pressing dies 30, 31 heat and press a fiber mat 11F therebetween to obtain a preboard 11P. The fiber mat 11F is made of plant fibers and thermoplastic resin. The molding device 40 presses and molds the preboard 11P into a product form.

Figure 3:
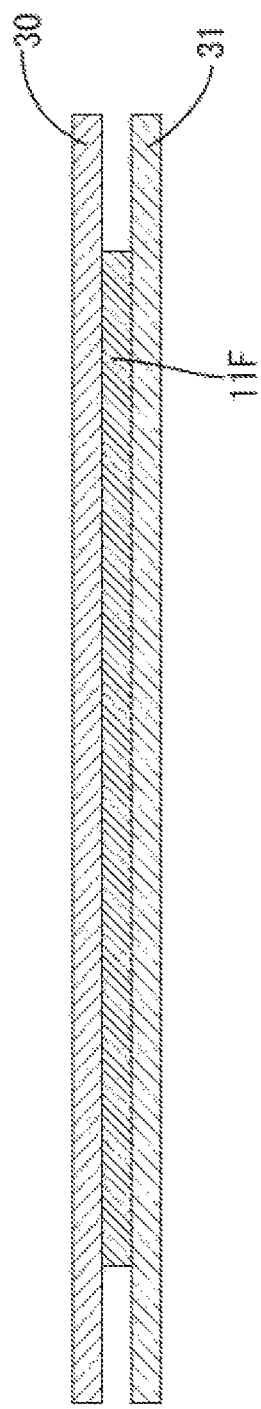
FIG. 3 is a cross-sectional view illustrating a fiber mat that is being pressed by pressing dies in a preboard molding process.

The pressing dies 30, 31 illustrated in FIG. 3 can be closed and opened or moved to and away from each other by driving of a driving device such as an electric motor, an air cylinder, and a hydraulic cylinder. The pressing dies 30, 31 may be pressing plates or hot plates and include therein a heater that generates heat in response to supply of power. The pressing dies 30, 31 can be heated to a predefined temperature and heat and press the fiber mat 11F. Only one of the pressing dies 30, 31 may include the heater.

Figure 5:
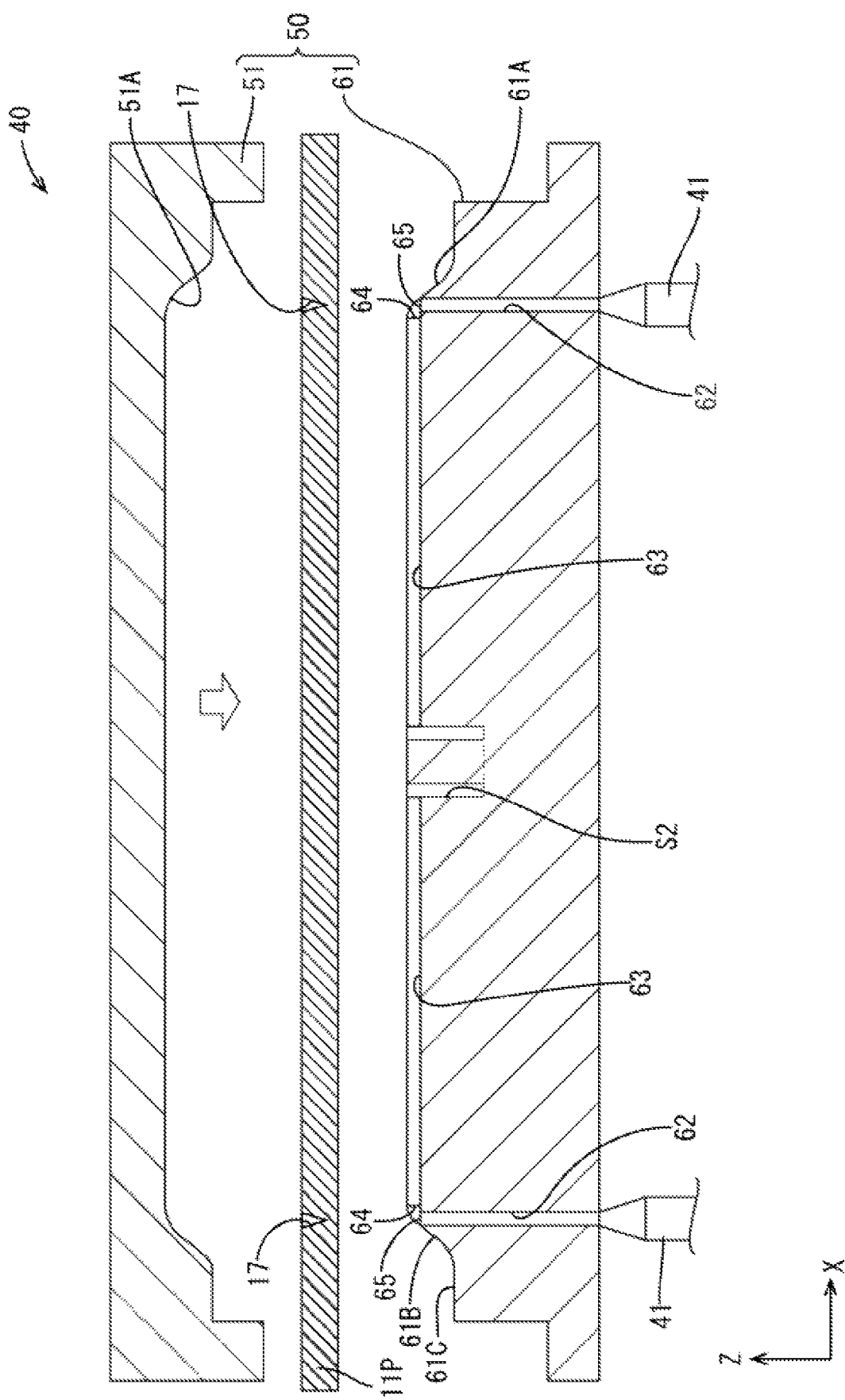
FIG. 5 is a cross-sectional view illustrating a molding device and the preboard when an upper die and a lower die are open.

As illustrated in FIG. 5, the molding device 40 includes injectors 41 and a molding die 50 that includes an upper die 51 and a lower die 61. The injectors 41 may be screw type injectors and are mounted on the lower die 61.

The upper die 51 is a movable die and can be moved with respect to the lower die 61, which is a fixed die, by driving of a driving device such as an electric motor, an air cylinder, and a hydraulic cylinder. The upper die 51 is moved closer to and away from the lower die 61 to close and open the molding die 50.

Figure 6:
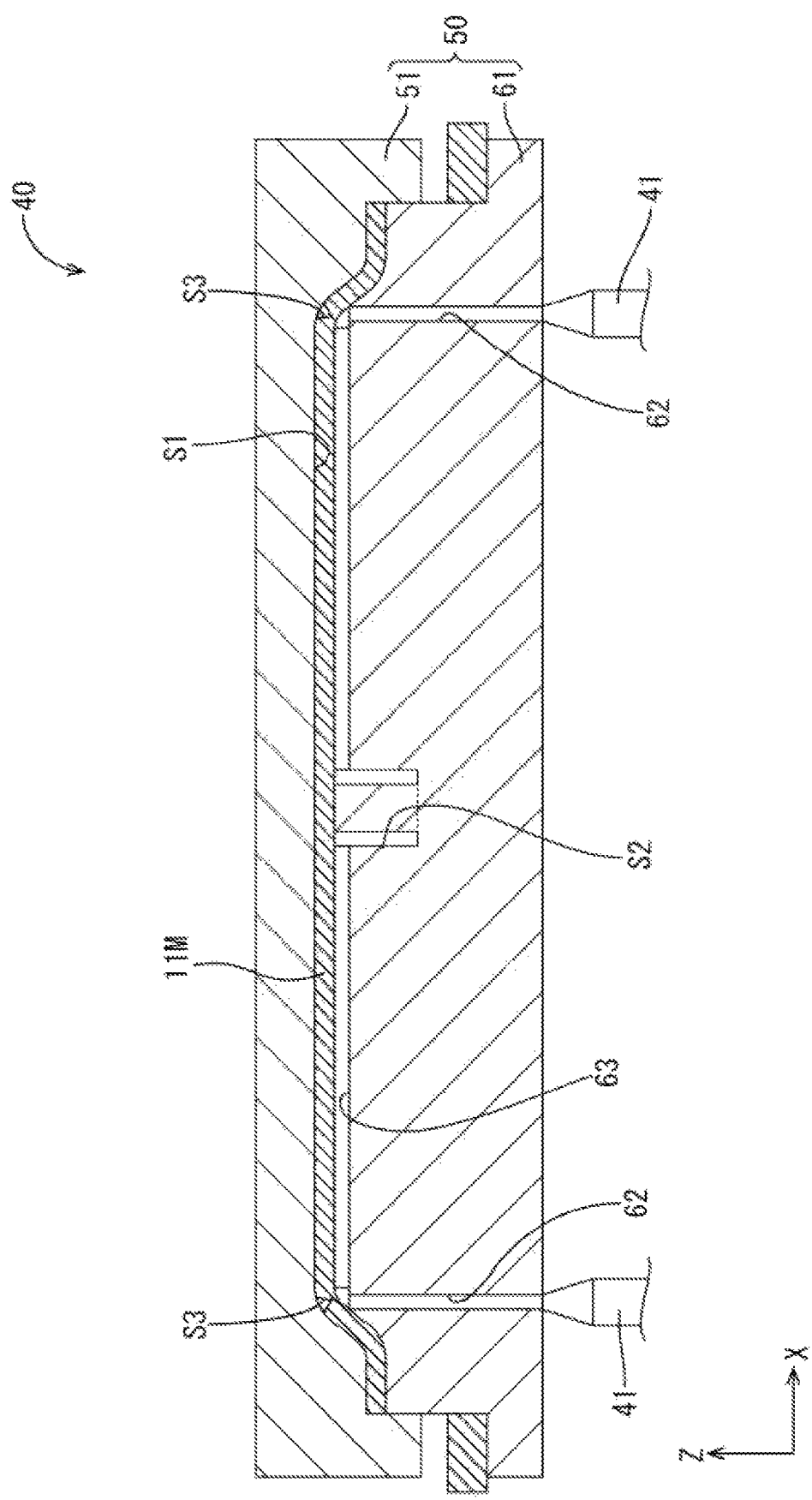
FIG. 6 is a cross-sectional view illustrating the molding device that is in a closed state in a trim board body member molding process.

The lower die 61 has a molding surface 61A that is an opposite surface opposite the upper die 51 and the molding surface 61A projects toward the upper die 51. The upper die 51 has a molding surface 51A that is an opposite surface opposite the lower die 61 and the molding surface 51A is recessed to follow the molding surface 61A of the lower die 61. As illustrated in FIG. 6, when the upper die 51 and the lower die 61 are closed and the molding die 50 is in a closed state, the upper die 51 is opposite and away from the lower die 61 with having a distance equal to a plate thickness of the trim board 11 therebetween. Namely, when the molding die 50 is in the closed state, the upper die 51 and the lower die 61 have a trim board molding space S1 therebetween for molding the trim board 11. When the preboard 11P that is arranged between and pressed by the upper die 51 and the lower die 61, the preboard 11P is compressed to have a shape corresponding to the trim board molding space S1. Thus, the trim board 11 (a trim board body member 11M) is molded. The distance between the upper die 51 and the lower die 61 in the closed state of the molding die 50, which is a plate thickness of the trim board 11, is smaller than a plate thickness of the preboard 11P.

As illustrated in FIG. 5, the lower die 61 includes two first runners 63 and two second runners 64 on the molding surface 61A. The two first runners 63 and the two second runners 64 are recessed portions that open outward. The two first runners 63 extend in the X-axis direction and the two second runners 64 extend in the Y-axis direction. The molding surface 61A includes substantially flat middle surface and sloped surfaces 61B and flat edge surfaces 61C on two edges thereof extending in the Y direction. The sloped surfaces 61B extend from respective two edges of the flat middle surface and the second runners 64 extends along the respective two edges of the flat middle surface. The first angled portions 13 of the trim board 11 are to be formed at the two edges of the flat middle surface. The lower die 61 includes two gates 65 and each of the two gates 65 is at a crossing point of the first runner 63 and the second runner 64. The gate 65 is an inlet through which resin injected by the injector 41 is supplied. When the molding die 50 is in the closed state as illustrated in FIG. 6, the molten resin is injected into the first runners 63 and the second runners 64 through the gates 65 by the injectors 41. Namely, the molten resin is supplied from the back surface 11B side of the trim board 11 (the trim board body member 11M).

Figure 8:
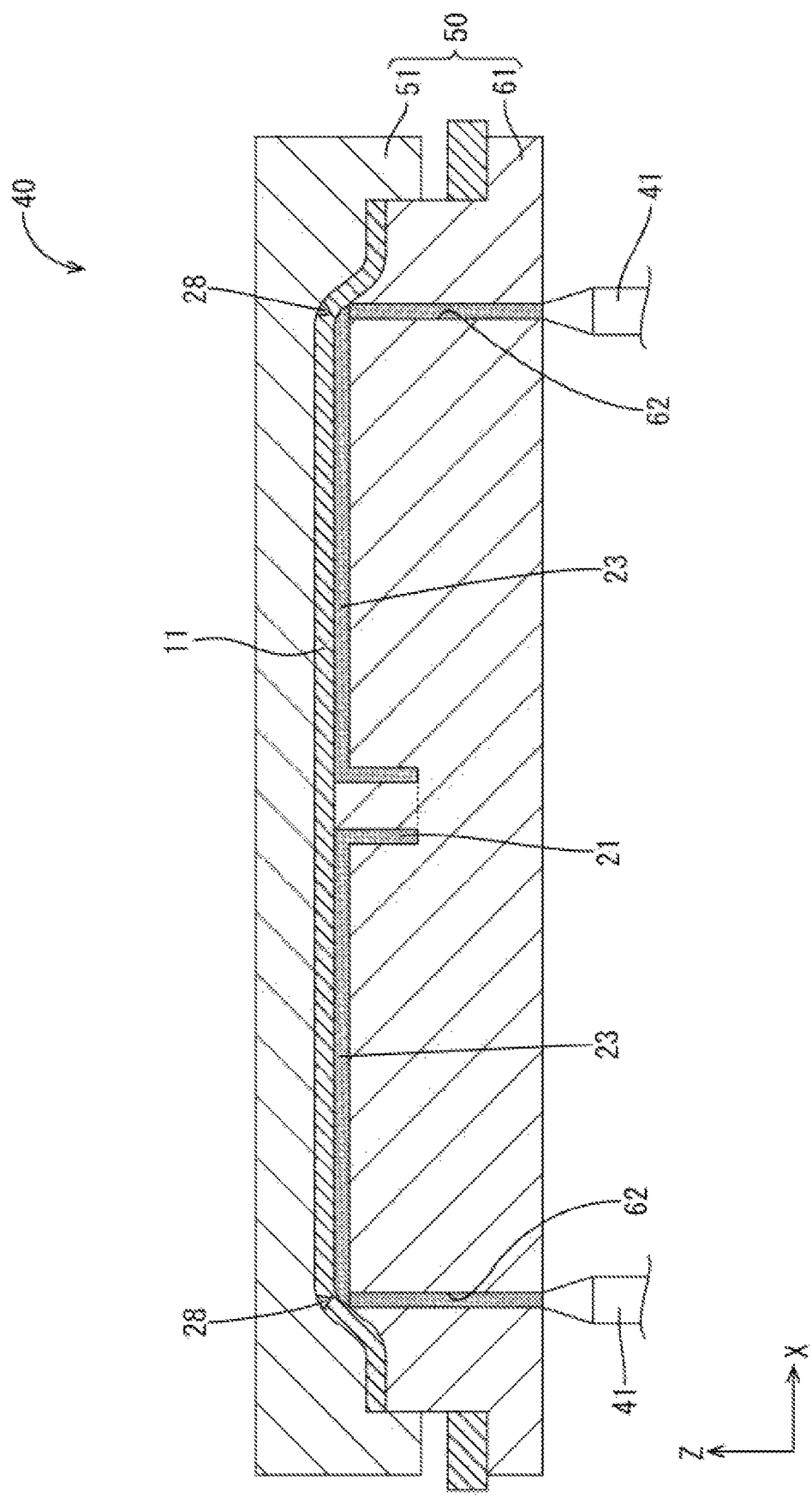
FIG. 8 is a cross-sectional view illustrating the molding device into which resin is injected in a resin portion molding process.

As illustrated in FIG. 5, the lower die 61 includes recesses that open on the molding surface 61A. The recesses include a mounting boss molding space S2 for forming the mounting boss 20 and support rib molding spaces for forming the support ribs 26. The first runners 63 are connected to the mounting boss molding space S2 and each of the second runners 64 is connected to the support rib molding spaces. Accordingly, as illustrated in FIG. 8, when the molding die 50 is in the closed state, the molten resin injected by the injectors 41 is injected into the mounting boss molding space S2 and the support rib molding spaces through the first runners 63 and the second runners 64.

Next, a method of producing the trim board 11 included in a door trim will be described. The method of producing the trim board 11 according to this embodiment includes a preboard forming process, a cutting process, a trim board body member forming process (one example of a board body member forming process), and a resin portion molding process (one example of a resin supplying process and a molding process). In the preboard forming process, the preboard 11P is molded. In the cutting process, the preboard 11P is cut to be in a predefined size and shape and have recesses 17 (a hole), which have a linear shape, in predefined portions. In the trim board body member forming process, the preboard 11P that has been subjected to the cutting process is molded with cold pressing by the upper die 51 and the lower die 61 without being heated to mold the trim board body member 11M. In the resin portion molding process, the molten resin is injected into the first runners 63 and the second runners 64 to mold the mounting boss 20, the support ribs 26, and the filling portions 28 integrally with the trim board body member 11M.

<Preboard Forming Process>

In the preboard forming process, as illustrated in FIG. 3, the fiber mat 11F formed of fibers and thermoplastic resin is disposed between the flat pressing dies 30, 31 and heated and pressed. Accordingly, the fiber mat 11F is compressed and the thermoplastic resin included in the fiber mat lip is melted onto the fibers. Then, the thermoplastic resin included in the fiber mat 11F is cooled and solidified and the preboard 11P is obtained.

<Cutting Process>

Figure 4:
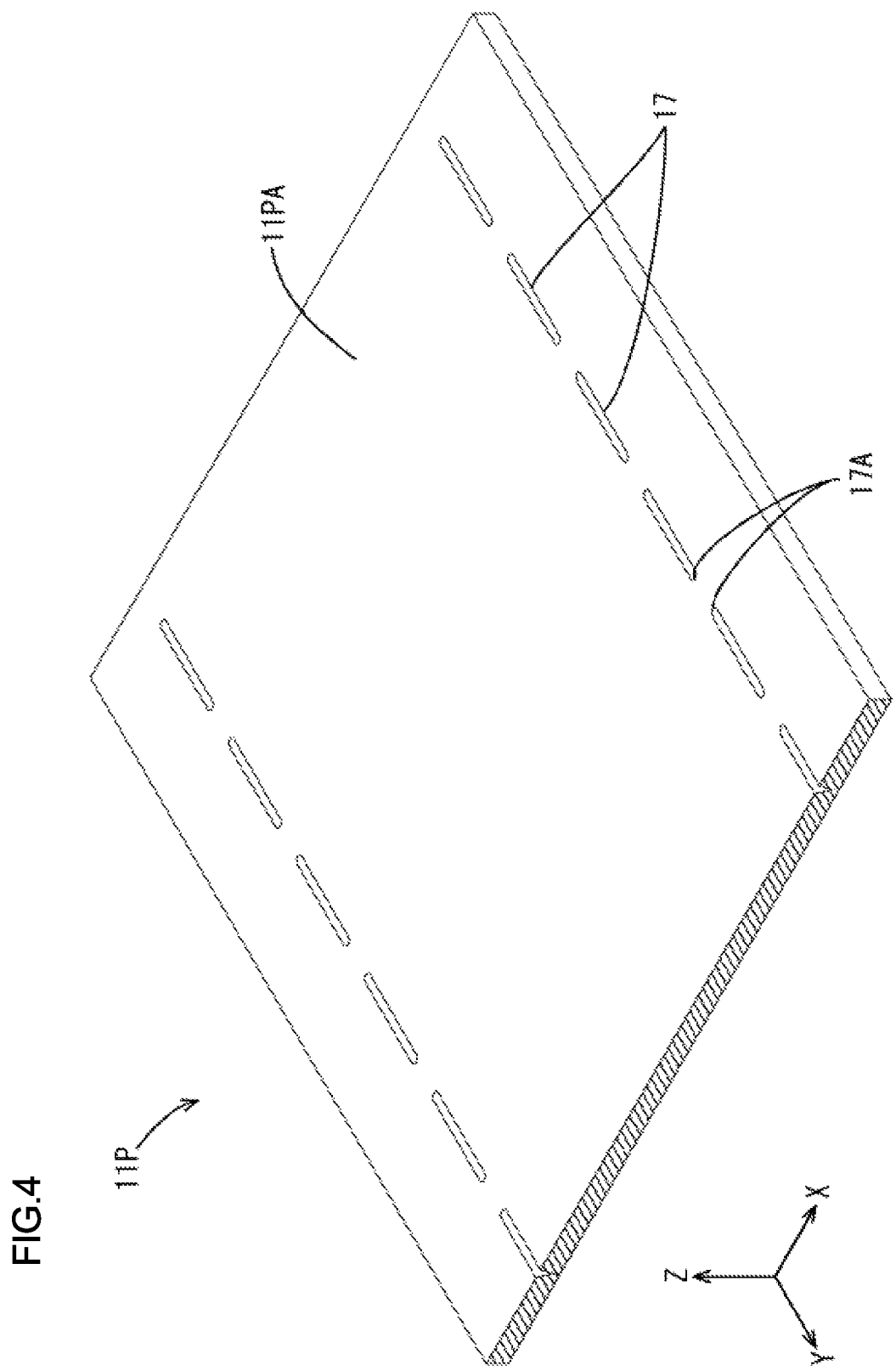
FIG. 4 is a perspective view illustrating the preboard in which recesses are formed in a cutting process.

In the cutting process, the preboard 11P is cut to be in a predefined size and a predefined shape by a cutting device. As illustrated in FIG. 4, the recesses 17, which have a linear shape, are formed with cutting in the preboard 11P. The recesses 17 are formed at intervals in two rows that correspond to the first angled portions 13 that are to be molded. The recesses 17 are formed on the front surface 11PA of the preboard 11P. Each of the recesses 17 is longer than an interval between the adjacent recesses 17. The recesses 17 have a depth dimension, which will be described later.

<Trim Board Body Member Molding Process>

In the trim board body member molding process (one example of the board body member molding process), as illustrated in FIG. 5, the preboard 11P, which is cooled down, is disposed between the upper die 51 and the lower die hi at a normal temperature (while not being heated). In this state, the preboard 11P is disposed on the lower die 61 such that the front surface 11PA having the recesses 17 faces upward. Next, as illustrated in FIG. 6, the upper die 51 and the lower die 61 are closed and the preboard 11P is pressed and molded with the molding surfaces 51A and 61A of the upper die 51 and the lower die 61. Thus, the preboard 11P is molded into a shape corresponding to the shape of the trim board molding space S1.

Figure 7:
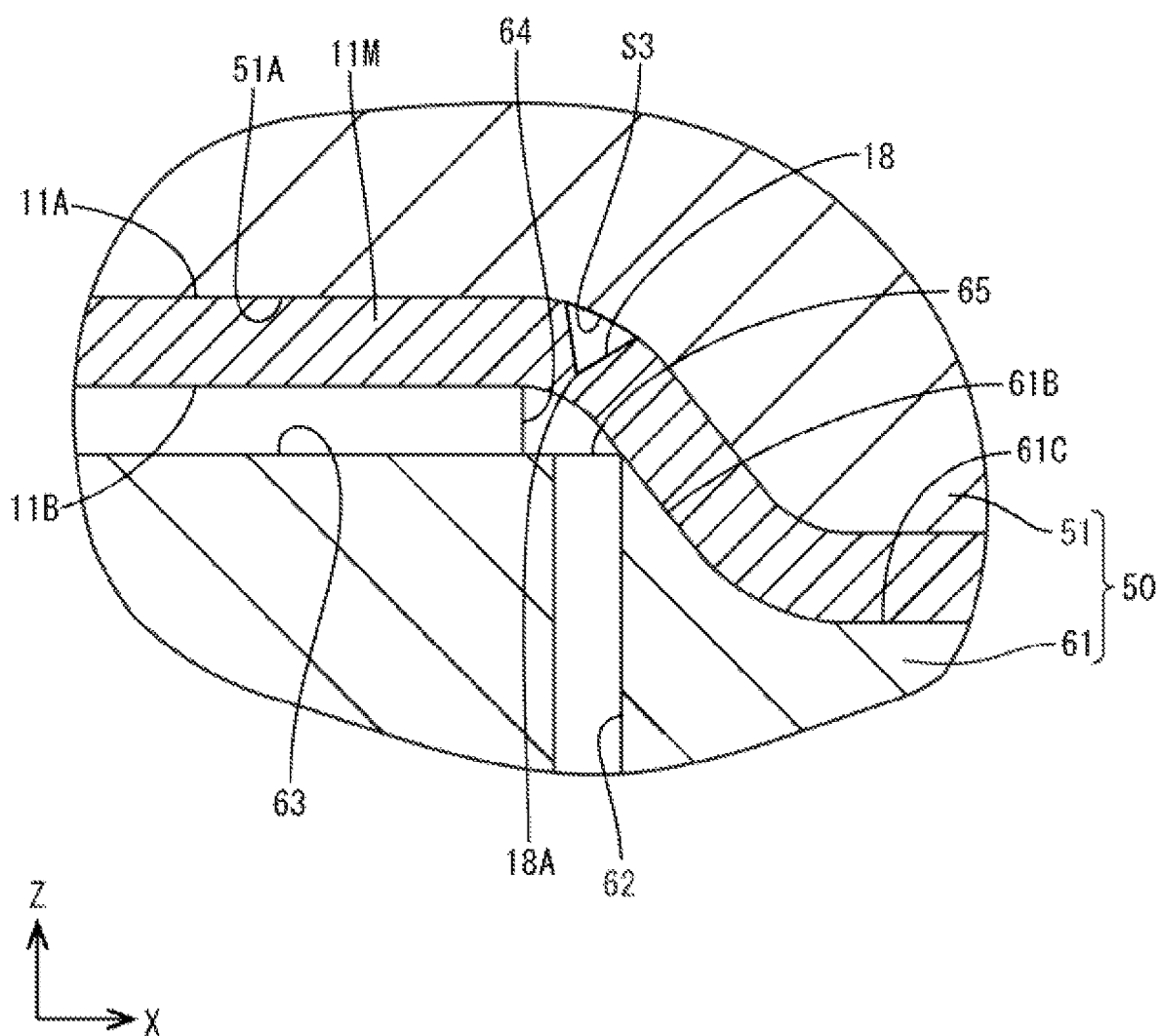
FIG. 7 is an enlarged cross-sectional view illustrating a portion of FIG. 6.

In the press molding, the preboard 11P is bent along each of the rows of recesses 17 and the first angled portion 13 is formed along each of the rows of recesses 17. In this embodiment, since the preboard 11P is not heated in the press molding, the preboard 11P is harrier compared to the one that is heated. Therefore, in the process of bending the preboard 11P to form the first angled portions 13, the recesses 17 are torn at the ends 17A thereof and the openings of the recesses 17 are enlarged. Then, opposing ends 17A of every two adjacent recesses 17 become continuous to each other. As a result, the recesses 17 included in each of the two rows are continuous to each other and become a groove 18. In the press molding, when the preboard 11P is bent along the rows of recesses 17, the recesses 17 are widely opened at the openings thereof. As illustrated in FIG. 7, the groove 18 (one example of a hole) having a V-shaped cross sectional shape is formed on the front surface 11A and thus, the trim board body member 11M is obtained. Unlike the trim board 11, the trim board body member 11M does not include the filling portions 28.

When the upper die 51 and the lower die 61 are closed and the first angled portions 13 are formed, a space is defined by each V-shaped groove 18 and the molding surface 51A of the upper die 51 as illustrated in FIG. 7. The space is a filling portion molding space S3 for molding the filling portions 28. The groove 18 has a bottom 18A and has a greatest depth between the groove opening and the bottom 18A. The bottom 18A is adjacent to or at the hack surface 11B of the trim board body member 11M. In the cutting process, the depth dimension of the recesses 17 is determined such that the bottom 18E of the groove 18 is adjacent to or at the back surface 119 of the trim board body member 11M. Or, alternatively, in the cutting process, the recesses 17 may include through holes in a section of the bottom 18A to be through to the hack surface 11B.

When the trim hoard body member 11M is pressed as illustrated in FIG. 6, the mounting boss molding space S2 for forming the mounting boss 20 and the support rib molding spaces for forming the support ribs 26 are between the trim board body member M and the lower die 61. The mounting boss molding space S2 is continuous from the first runners 63 that are continuous from supply channels 62 via the gates 65. The support rib molding spaces are continuous from the second runners 64 that are continuous from the supply channels 62 via the gates 65.

<Resin Portion Molding Process>

In the resin portion molding process (one example of the resin supplying process and the molding process), as illustrated in FIG. 8, the molten resin is injected into the first runners 63 and the second runners 64 via the supply channels 62 and the gates 65 by the injectors 41 while the molding surface 51A of the upper die 51 and the molding surface 61A of the lower die 61 pressing the trim board body member 11M. The molten resin injected into the first runners 63 is further injected into the mounting boss molding space S2. The molten resin injected into the second runners 64 is further injected into the support rib molding spaces. Accordingly, the first runners 63, the mounting boss molding space 82, the second runners 64, and the support rib molding spaces are filled with the molten resin.

In this embodiment, the trim board body member 11M is impregnated with the molten resin that is injected into the second runners 64 through the back surface 11B facing the second runners 64. Portions of the trim board body member 11M that are adjacent to the grooves 18 are impregnated with the molten resin and the molten resin reaches the bottoms 18A of the grooves 18. The molten resin flows into the filling portion molding spaces S3 through the bottoms 18A and the filling portion molding spaces S3 are filled with the molten resin. Or, alternatively, the molten resin that is injected into the second runners 64 flows into the filling portion molding spaces S3 in the grooves 18 through the through holes of the bottoms 18E that are through to the hack surface 11B. Thus, the filling portion molding, spaces S3 are filled with the molten resin.

Figure 9:
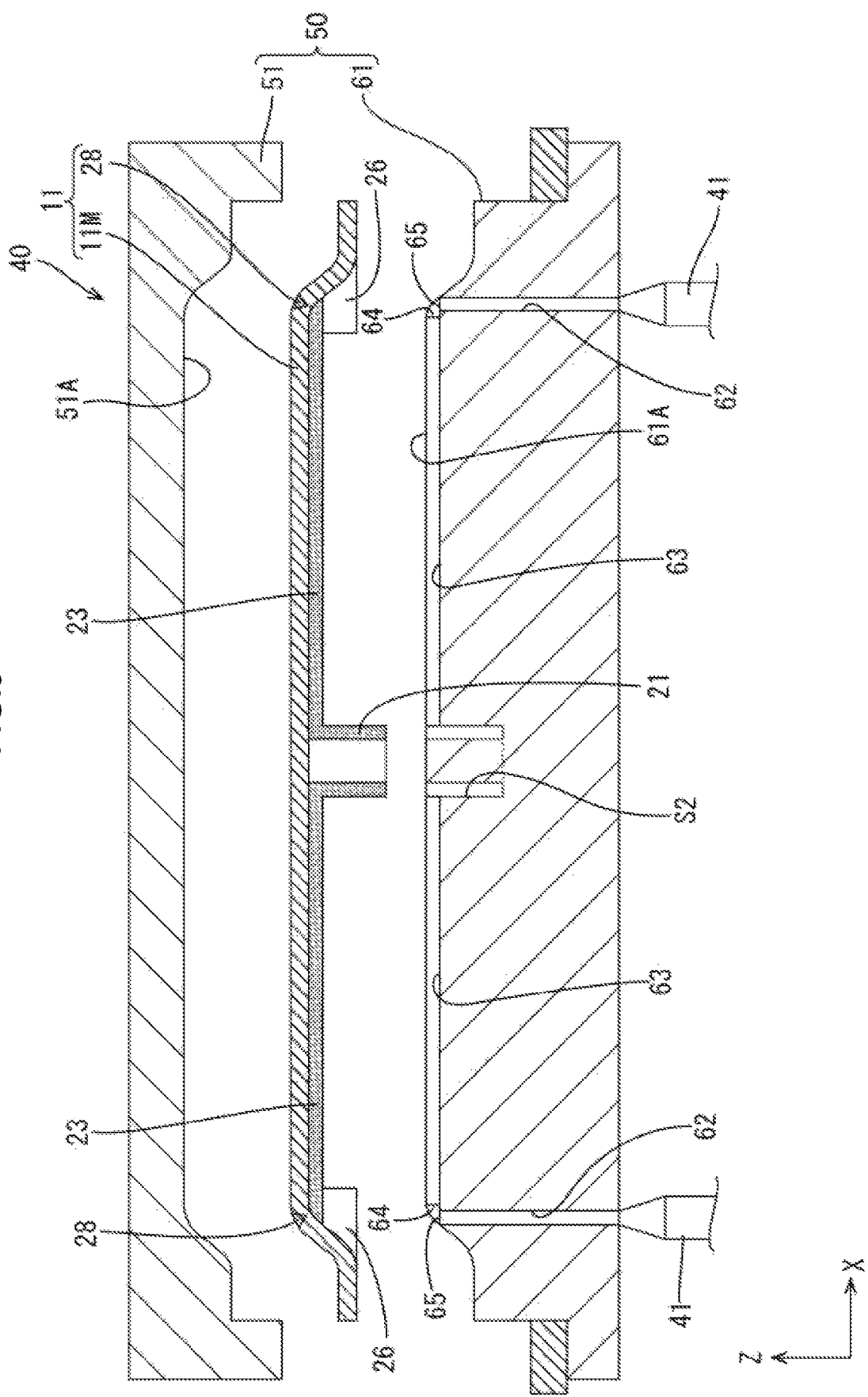
FIG. 9 is a cross-sectional view illustrating the molding device and a completed door trim when the upper die and the lower die are opened.

Thereafter, the molten resin that is in the mounting boss molding space S2, the support rib molding spaces, the filling portion molding spaces S3, the first runners 63, and the second runners 64 is cooled down. Accordingly, the trim board 11 that includes the trim board body member 11M and the filling portions 28 is completed and the trim board 11 that integrally includes the mounting boss 20, the support ribs 26, the first ribs 23, and the second ribs 25 is completed in one step. After the thermoplastic resin included in the trim board 11 is cooled and solidified, the upper die 51 and the lower die 61 are opened and the trim board 11 is removed from the molding die 50 as illustrated in FIG. 9. Thus, production of the trim board 11 is completed.

Next, operations and advantageous effects of this embodiment will be described. The trim board 11 according to this embodiment is a component of the door trim and is a plate member including fibers and thermoplastic resin. The trim board 11 includes the first angled portions 13 at which the trim board 11 is bent toward the back surface 11B and stretched on the front surface 11A side. The trim board 11 further includes the linear grooves 18 on the front surface 11A of the first angled portions 13, respectively. The grooves 18 are filled with thermoplastic resin and the thermoplastic resin in the grooves 18 correspond to the filling portions 28.

According to the above configuration, since the grooves 18 are filled with thermoplastic resin and the trim board 11 includes the filling portions 28 at the first angled portions 13, respectively, the trim board 11 has higher rigidity at the first angled portions 13 compared to a trim board that is obtained only by bending a board formed of fibers and thermoplastic resin. In molding the trim board 11 having the above structure, the preboard 11P is not heated in molding (just before the molding) and is still hard when molding. However, the preboard 11P includes the recesses 17 on the front surface 11PA that is to be stretched in the bending and the grooves 18 are formed by deforming the recesses 17 at predefined portions of the preboard 11P when the preboard 11P is bent. Therefore, the preboard 11P is less likely to be torn or broken in any other portions than the predefined portions corresponding to the recesses 17.

Since the trim board 11 includes the filling portions 28 in the grooves 18 at the angled portions 13, the bent portions 27 are stably supported by the filling portions 28 and the trim board 11 is kept in the bent form. According to the trim board 11 of this embodiment, the trim board 11 has high rigidity at the first angled portions 13. Further, according to the method of producing the trim board 11 of this embodiment, the heating process is not necessary before molding the trim board and therefore, peculiar bad smell is less likely to be caused by the molding and volatile organic compounds are less likely to be generated.

The trim board 11 includes the second ribs 25 on the back surface 11B of the first angled portions 13. The second ribs 25 extend along the first angled portions 13, respectively. The resin used for the second ribs 25 and the resin used for the filling portions 28 are same thermoplastic resin.

When the grooves 18 are filled with the resin, the molten resin injected to the spaces from the back surface 11B side of the trim board body member 11M flows into molding spaces (the second runners) for molding the second ribs 25 and to the grooves 18 via the first angled portions 13 of the trim board 11. Therefore, a mark of an injection outlet is not created on a portion of the front surface 11A corresponding to the groove 18 to be filled with the molten resin and the trim board 11 with good appearance is molded. The bent form of the trim board can be stably maintained by the second ribs 25.

The trim board 11 includes the mounting boss 20 on the back surface 11B and the mounting boss 20 is made of thermoplastic resin and formed with injection molding. The mounting boss 20 is made of resin that is same as thermoplastic resin that is used for the second ribs 25 and the filling portions 28 in the grooves 18.

When the mounting boss 20 is formed with injection molding on the back surface 11B of the trim board 11, the second ribs 25 are formed and the grooves 18 are filled with the thermoplastic resin to form the filling portions 28 in one step.

The trim board 11 includes the support ribs 26 on the back surface 11B of the first angled portions 13 (the inner surface of the corners). The support ribs 26 extend to straddle the surfaces sandwiching the first angled portion 13 therebetween (the flat portion 12 and the sloped portion 14) and keep the bent form of the bent portions 27 including the first angled portions 13.

The above configuration is achieved without heating the trim board 11 (the preboard 11P) during the molding process. With such a configuration, the first angled portions 13 can keep the bent form stably and increase rigidity thereof.

The technology described herein is a method of producing the trim board 11. The method includes the preboard molding process, the cutting process, the trim board body member molding process, and the resin portion molding process (the resin supplying process) that are performed in this order. In the preboard molding process, the fiber mat 11F including fibers and thermoplastic resin is pressed with heated by the pressing dies 30, 31 to mold the preboard 11P. In the cutting process, the recesses 17 are formed in the predefined portions of the preboard 11P with cutting. In the trim board body member molding process, the preboard 11P is pressed by the molding die 50 with the molding surfaces 51A, 61A to be bent along each of the recesses 17 such that the front surface 11A having the recesses 17 is to be stretched. According to the bending, the grooves 18 are formed by enlarging openings of the recesses 17 and the trim board body member 11M including the first angled portions 13 and the grooves 18 is molded. In the resin portion molding process (the resin supplying process), the grooves 18 are filled with thermoplastic resin.

According to such a method, in the cutting process, the recesses 17 are previously formed in the predefined portions of front surface 11PA of the preboard 11P that are to be stretched. The grooves 18 are formed in the predefined portions of the trim board 11 when the trim board 11 is molded and bent in the hoard body member molding process. The trim hoard 11 is easily bent in the board body member molding process without heating and the trim board 11 is less likely to be torn or broken in any other portions than the predefined portions. Since the grooves 18 are filled with thermoplastic resin in the resin supply process, the trim board 11 can keep the bent form. The heating process is not necessary before the process of molding the trim board.

In the resin portion molding process, the thermoplastic resin is injected into the spaces from the back surface 11B side of the trim board body member 11M and the grooves 18 are filled with the thermoplastic resin.

According to such a method, a gate mark (a mark of an outlet) is not created on a portion of the front surface 11A corresponding to the groove 18 and the trim hoard 11 with good appearance is molded.

The trim board 11 includes the mounting boss 20 on the hack surface 11B and the mounting boss 20 is made of the thermoplastic resin that is same as the resin filled in the grooves 18. The filling portions 28 and the mounting boss 20 are molded in one step of the resin portion molding process.

According to such a method, the mounting boss 20 and the filling portions 28 are molded at the same time and this simplifies the producing process.

Second Embodiment

A second embodiment will be described with reference to FIGS. 10 and 11. In the following description, configurations that are different from those of the first embodiment will be described and the configurations that are similar to those of the first embodiment are represented by the same symbols and will not be described.

In the first embodiment, the linear recesses 17 included in each row become continuous to each other by bending the preboard 11P to form the long linear groove 18. In this embodiment, a preboard includes rows of through holes 118 along which the preboard is bent.

A trim board 111 of this embodiment is made of fibers and thermoplastic resin and specific material used for the trim board 111 is similar to that in the first embodiment. As illustrated in FIGS. 9 and 10, the trim board 111 has a plan view quadrangular plate shape as a whole and includes bent portions 127 at two opposite edges extending in the Y-axis direction and the bent portions 127 are bent downward in FIG. 9. The trim board 111 includes a flat portion 112 in a middle section thereof with respect to the X-axis direction and the bent portions 127 on respective two edges of the flat portion 12 extending in the Y-axis direction. Each of the bent portions 127 includes a first angled portion 113 (one example of the angled portion), the sloped portion 14, the second angled portion 115, and the flange portion 16. The bent portion 127 has the same configuration as that of the bent portion 27 except for the configuration of the first angled portion 113.

Figure 10:
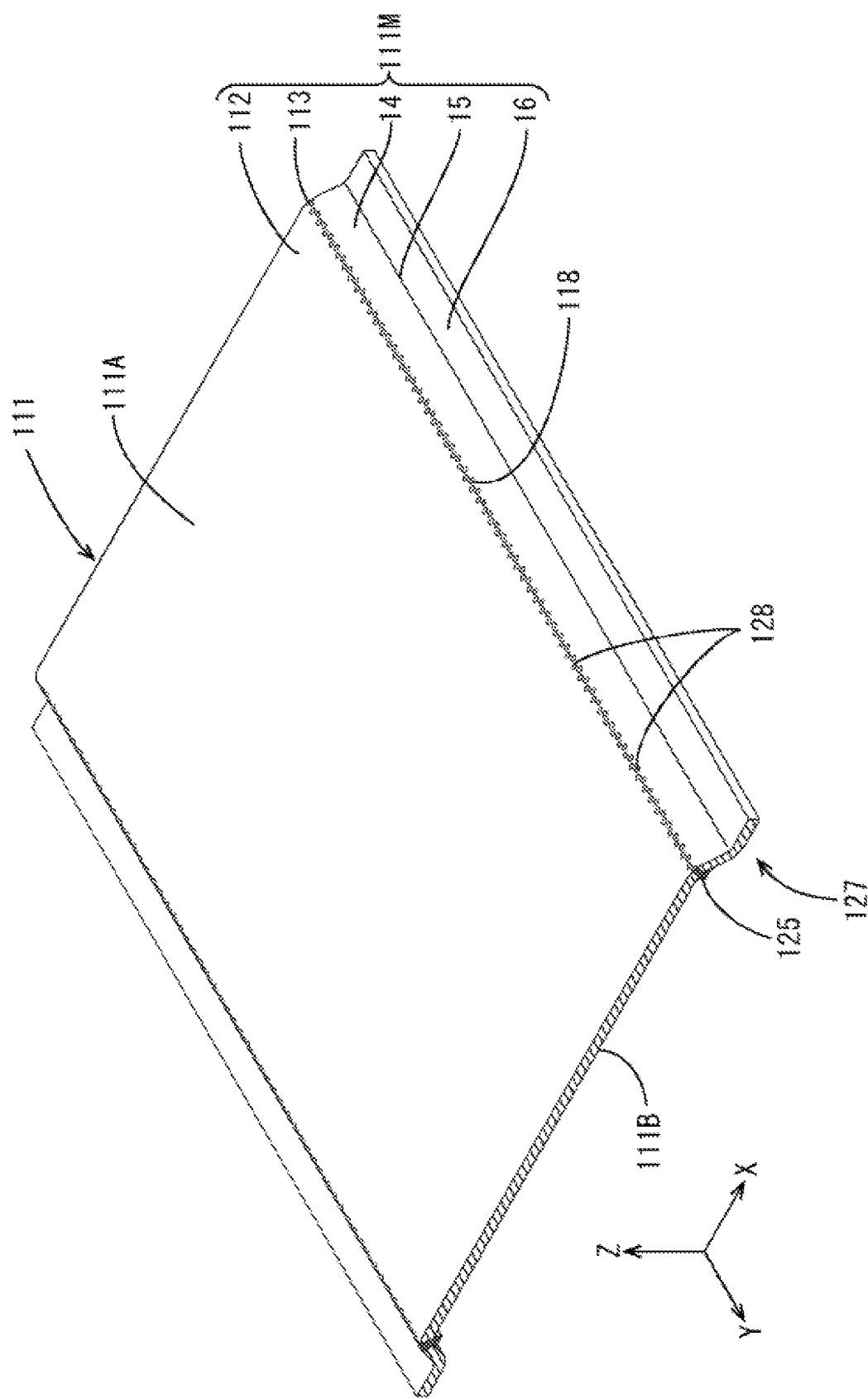
FIG. 10 is a perspective view illustrating a portion of a door trim according to a second embodiment seen from a front side.

As illustrated in FIGS. 9 and 10, the trim board 111 includes through holes 118 (one example of the hole) that are formed with cutting. The through holes 118 are formed at intervals in two rows in the respective first angled portions 113. The through holes 118 are through the trim board 111. The through holes 118 included in each of the two rows are arranged in a zig zag manner. Namely, the through holes 118 in each of the two rows are not arranged in a straight line and are spaced from each other with respect to the X-axis direction. In this embodiment, a preboard includes the two rows of the through holes 118. With such a configuration, even if the position of a preboard is deviated from the correct position in the molding die 50 with respect to the X-axis direction in the trim board body member molding process, the position deviation can be absorbed.

As illustrated in FIGS. 10 and 11, the trim board 111 further includes filling portions 128 and second ribs 125 (one example of the rib). The filling portions 128 are in the respective through holes 118 and the second ribs 125 are on the back surface 111B of the respective first angled portions 113. The second ribs 125 extend along the entire length of the first angled portions 113, respectively, in the Y-axis direction. The filling portions 128 extend through the through holes 118 and extend from a front surface 111A to the back surface 111B. The filling portions 128 are continuous to the second ribs 125 at the back surface 11B side ends thereof and are integrally molded with the second ribs 125.

A method of producing the trim board 111 includes the preboard molding process, a cutting process, a trim board body member molding process, and a resin portion molding process (the resin supplying process) that are performed in this order. The preboard molding process is similar to that in the first embodiment. In the cutting process, the through holes 118 are formed in the predefined portions of the preboard with cutting, in the trim board body member molding process, the preboard is pressed by the molding die 50 with the molding surfaces 51A, 51A to be bent along each row of the through holes 118 such that the from surface 111A is to be stretched and the openings of the through holes 118 on the front surface 111A are enlarged.

In the resin portion molding process (the resin supplying process and the molding process), the molten resin is injected into the first runners 63 and the second runners 64 via the supply channels 62 and the gates 65 by the injectors 41 while the molding surface 51A of the upper die 51 and the molding surface 61A of the lower die 61 pressing the trim board body member 111M. The molten resin injected into the first runners 63 is further injected into the mounting boss molding space S2. The molten resin injected into the second runners 64 for molding second ribs 125 is further injected into the support rib molding spaces. Accordingly, the first runners 63, the mounting boss molding space S2, the second runners 64, and the support rib molding spaces are filled with the molten resin. The second runners 64 are continuous to the through holes 118. Therefore, the molten resin injected into the second runners 64 flows into the through holes 118 from openings of the through holes 118 on the back surface 111E. Thus, the through holes 118 are filled with the molten resin. The molten resin in the through holes 118 is cooled and solidified and the filling portions 128 are formed.

According to this embodiment, the through holes 118 included in each of the two rows are arranged in a zig zag manner in the X-axis direction. With such a configuration, in addition to the operations and advantageous effects of the first embodiment, the position deviation of the preboard with respect to the molding die in the X-axis direction can be absorbed.

Other Embodiments

The technology described herein is not limited to the embodiments described above with reference to the drawings. The following embodiments may be included in the technical scope.

(1) In the first embodiment, the filling portions 28 are molded by supplying the molten resin into the grooves 18 from the back surface 11B side of the trim board body member 11M. However, the filling portions 28 may be molded by directly injecting the molten resin into the grooves 18 from the front surface 11A side of the trim board body member 11M. In such a method, the upper die 51 may include resin injection gates and the molten resin is directly injected into the filling portion molding spaces S3 to mold the filling portions 28.

(2) In the first embodiment, the mounting boss 20 is integrally molded with the trim board 11 on the back surface 11B with injection molding. However, any component other than the mounting boss 20 may be integrally molded with the trim board 11 or the trim board 11 may not include molded components such as the mounting boss 20.

(3) In the first embodiment, the trim board 11 includes the support ribs 26 for keeping the shape of the bent portions 27 including the first angled portions 13. However, the support member such as the support ribs 26 may not be included.

(4) The shape of the hole such as the recesses in the preboard is not limited to the shapes of the above embodiments but may be modified as appropriate. For example, the recesses are arranged in a line in the first embodiment; however, a long straight recess may be formed in the preboard.

(5) In the above embodiments, the trim board 11 is described as one example of the board, which is a vehicular interior component. However, the board may be a board included in a seat as a seat back and the preboard may be molded into the board of the seat back.

The invention claimed is:

1. A board including fibers and thermoplastic resin and having a first surface and a second surface that is opposite from the first surface, the board comprising:
    a flat body member having edges;
    a bent portion that extends from one of the edges of the flat body member and includes an edge of the board, the bent portion including an angled portion that extends along the one of the edges of the flat body member, the bent portion extending from the angled portion at an inclination angle with respect to the flat body member such that the first surface of the angled portion is stretched;
    a hole that is in the first surface of the angled portion; and
    a filling portion that is made of thermoplastic resin and in the hole.

2. The board according to claim 1, further comprising a rib that extends along the angled portion and on the second surface and is made of the thermoplastic resin that is same as the thermoplastic resin of the filling portion.

3. The board according to claim 1, further comprising a molded component that is molded on the second surface and made of the thermoplastic resin that is same as the thermoplastic resin of the filling portion.

4. The board according to claim 1, wherein
    the bent portion includes a sloped portion that extends from the angled portion at the inclination angle toward the edge of the board, and the board further comprises:
    a support member that is on the second surface of the bent portion and extends from the flat body member to the sloped portion via the angled portion and keeps a bent form of the bent portion.

5. The board according to claim 1, wherein the hole is a long groove that extends along an entire length of the angled portion.

6. The board according to claim 5, wherein the long groove has a cross-sectional shape of a V-shape.

7. The board according to claim 1, wherein
    the hole includes through holes that are arranged in a row along an entire length of the angled portion, and
    the filling portion includes filling portions that are put in the through holes.

8. The board according to claim 7, wherein the through holes included in the row are arranged in a zig zag manner.

9. The board according to claim 1, wherein the board is a vehicular trim board included in a vehicular door trim.

\* \* \* \* \*